(12) United States Patent
St. Germain

(10) Patent No.: US 9,293,028 B2
(45) Date of Patent: Mar. 22, 2016

(54) ROUNDSLINGS WITH RADIO FREQUENCY IDENTIFICATION PRE-FAILURE WARNING INDICATORS

(71) Applicant: Slingmax, Inc., Aston, PA (US)

(72) Inventor: Scott St. Germain, Garnet Valley, PA (US)

(73) Assignee: Slingmax, Inc., Aston, PA (US)

( * ) Notice: Subject to any disclaimer, the term of this patent is extended or adjusted under 35 U.S.C. 154(b) by 35 days.

(21) Appl. No.: 14/153,316

(22) Filed: Jan. 13, 2014

(65) Prior Publication Data

US 2015/0199893 A1 Jul. 16, 2015

(51) Int. Cl.

| | |
|---|---|
| G08B 1/08 | (2006.01) |
| G08B 21/18 | (2006.01) |
| B66C 1/12 | (2006.01) |
| G06K 19/07 | (2006.01) |
| G06K 19/077 | (2006.01) |
| G06K 7/10 | (2006.01) |
| B66C 1/18 | (2006.01) |
| F16G 11/14 | (2006.01) |
| B66C 1/14 | (2006.01) |
| B66C 15/00 | (2006.01) |
| D07B 1/14 | (2006.01) |

(52) U.S. Cl.
CPC . *G08B 21/18* (2013.01); *B66C 1/12* (2013.01); *B66C 1/14* (2013.01); *B66C 1/18* (2013.01); *B66C 15/00* (2013.01); *D07B 1/145* (2013.01); *F16G 11/14* (2013.01); *G06K 7/10366* (2013.01); *G06K 19/0716* (2013.01); *G06K 19/07749* (2013.01); *G06K 19/07758* (2013.01); *G06K 19/07798* (2013.01)

(58) Field of Classification Search
CPC .............. B66C 1/12; B66C 1/14; B66C 1/18; F16G 11/14; D07B 7/165; D04C 1/12; G06K 19/07749; G06K 19/07758; G08B 13/2434
USPC ............... 340/539.1, 572.8; 87/7; 139/426 R; 294/74; 57/21, 201
See application file for complete search history.

(56) References Cited

U.S. PATENT DOCUMENTS

| | | |
|---|---|---|
| 5,561,973 A | 10/1996 | St. Germain |
| 5,651,572 A | 7/1997 | St. Germain |
| 5,651,573 A | 7/1997 | St. Germain |

(Continued)

FOREIGN PATENT DOCUMENTS

DE 202012102710 U1 8/2012

OTHER PUBLICATIONS

Int'l Search Report and Written Opinion issued Aug. 20, 2014 in Int'l Application No. PCT/US2014/011257.

*Primary Examiner* — John A Tweel, Jr.
(74) *Attorney, Agent, or Firm* — Panitch Schwarze Belisario & Nadel LLP

(57) ABSTRACT

Roundslings with radio frequency identification pre-failure warning indicators comprise radio frequency identification tags, radio frequency identification tag sensors, and radio frequency signal receivers that inform a user of a pre-failure condition with the roundsling. The radio frequency tags may be affixed to one or more of an indicator yarn, a strand of the roundsling core, a dedicated strand of a pre-failure indicator assembly, or a ring of the pre-failure indicator assembly. The radio frequency tags may be active or passive, and active radio frequency tags may comprise a shield that block a signal transmitted from the tag.

19 Claims, 17 Drawing Sheets

(56) References Cited

U.S. PATENT DOCUMENTS

| | | |
|---|---|---|
| 6,422,624 B1 * | 7/2002 | Kauffman et al. ............ 294/74 |
| 7,240,475 B2 * | 7/2007 | Smeets et al. ................ 57/21 |
| 7,568,333 B2 | 8/2009 | St. Germain |
| 7,661,737 B2 | 2/2010 | St. Germain |
| 7,669,904 B1 | 3/2010 | Carmichael |
| 7,744,138 B2 | 6/2010 | St. Germain |
| 7,926,859 B2 | 4/2011 | St. Germain |
| 8,322,765 B2 | 12/2012 | St. Germain |
| 8,540,295 B2 * | 9/2013 | Babinchak ................ 294/74 |
| 8,727,406 B2 * | 5/2014 | Dohse et al. ............. 294/74 |
| 2011/0298231 A1 | 12/2011 | Dohse et al. |
| 2013/0319565 A1 | 12/2013 | St. Germain, Jr. et al. |
| 2014/0178615 A1 * | 6/2014 | Broadway et al. ............ 87/7 |

* cited by examiner

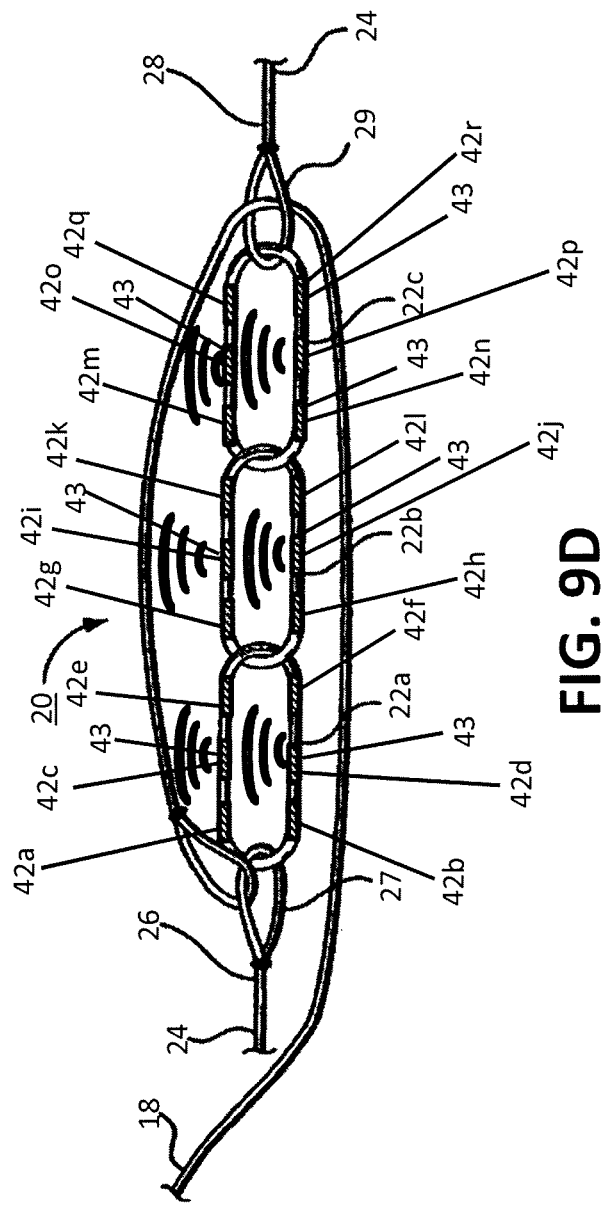

ROUNDSLINGS WITH RADIO FREQUENCY IDENTIFICATION PRE-FAILURE WARNING INDICATORS

FIELD OF THE INVENTION

The invention relates generally to industrial slings used to lift, move and transport heavy loads and, more particularly, relates to RFID-based warning indicators that notify an operator of the sling of a condition that if not mitigated may lead to failure of the sling.

BACKGROUND OF THE INVENTION

Various publications, including patents, published applications, technical articles, and scholarly articles are cited throughout the specification. Each of these materials is incorporated by reference herein, in its entirety and for all purposes.

Industrial slings are typically prepared from metals or synthetic materials. Wire rope slings are commonly made of a plurality of metal strands twisted together and secured by large metal sleeves or collars. Synthetic slings are usually comprised of a lifting core made of twisted strands of synthetic fiber and an outer cover that protects the core. One popular design of synthetic slings is a roundsling in which the lifting core forms a continuous loop and the sling has a circular or oval-shaped appearance.

Modern industrial slings may experience failure and loss of a load caused by the sling breaking or failing, for example, because it was fatigued or because it was over-stretched or overloaded during a current or previous use. When subjected to an overload condition in excess of its rated capacity, a roundsling may be permanently damaged/deformed if the load stretches the fibers of the load bearing core material beyond their yield point. When a synthetic fiber sling is overloaded beyond its tensile strength or weight-lifting capacity at maximum stretch, it is considered to be fatigued and may never return to its normal strength and load bearing capacity.

Slings are generally provided with their load capacity (rated capacity) specified, particular sling. This allows users to know the lifting or load capacity of the sling. Nevertheless, this capacity is sometimes exceeded, either accidentally or by users engaging unsafe shortcuts during rigging and use of the sling. Often, over-load, fatigue, or damage to the sling materials may not be readily apparent, particularly given the large size or length of the sling, or because the load-bearing core is hidden inside the outer cover. If a roundsling has been fatigued or structurally changed, the sling may no longer be able to lift a load according to its maximum rated load capacity. Such a condition may potentially become a serious threat to the operators and riggers using the damaged sling.

Many commercially produced roundslings include a pre-failure indicator. Such failure indicators in practice have shown to be inconsistent, even among the same types of slings from the same manufacturer. Accordingly, there is a need in the art for more consistent and more reliable sling pre-failure indicators.

SUMMARY OF THE INVENTION

The disclosure features roundsling pre-failure warning systems. In some aspects, the systems comprise a roundsling comprising a load-bearing core, an indicator yarn comprising at least one radio frequency identification (RFID) tag affixed to the indicator yarn, and one or more RFID sensors comprising a transmitter for sending a wireless signal to a RFID signal receiver, and also comprise a RFID signal receiver. The systems may further comprise a pre-failure indicator assembly comprising a dedicated strand having an eye-loop on each end joined together via one or more rings that fail at a load capacity that is less than the maximum load capacity of the load-bearing core. The dedicated strand is preferably positioned proximate to the core. The indicator yarn is preferably connected to the dedicated strand. The indicator yarn is preferably brightly colored in order to be readily visible to operators or the roundsling. The RFID signal receiver may comprise hand-held wireless device such as a cellular telephone, tablet computer, or other form of wireless computer, and informs a user of a pre-failure condition with the roundsling by one or more of emitting an audible alarm, displaying a visible warning, and/or producing a tactile alarm.

In some aspects, the core is housed within a cover having an opening through which an end portion of the indicator yarn passes, thereby exposing the end portion of the indicator yarn to the exterior of the cover. The RFID tag may be affixed to a location about the visible/exterior end portion of the indicator yarn. The RFID sensor may be proximate to the opening. The indicator yarn may comprise a plurality of RFID tags, or may comprise at least two, at least three, or at least four, or more than four RFID tags.

The roundsling may be a one-path or two-path roundsling. In certain two-path roundslings, each path comprises a load-bearing core, an indicator yarn comprising one or more RFID tags affixed to the indicator yarn, and one or more RFID sensors comprising a transmitter for sending a wireless signal to a RFID signal receiver. Each path may further comprise a pre-failure indicator assembly comprising a dedicated strand having an eye-loop on each end joined together via one or more rings that fail at a load capacity that is less than the maximum load capacity of the load-bearing core. The dedicated strand is preferably positioned proximate to the core. The indicator yarn is preferably connected to the dedicated strand. The indicator yarn is preferably brightly colored in order to be readily visible to operators or the roundsling.

In some aspects, the systems comprise a roundsling comprising a load-bearing core, a pre-failure indicator assembly comprising a dedicated strand positioned proximate to the core and having an eye-loop on each end joined together via one or more rings that fail at a load capacity that is less than the maximum load capacity of the load-bearing core, and having one or more RFID tags affixed to the dedicated strand, and one or more RFID sensors comprising a transmitter for sending a wireless signal to a RFID signal receiver, and a RFID signal receiver. The RFID signal receiver may comprise hand-held wireless device such as a cellular telephone, tablet computer, or other form of wireless computer, and informs a user of a pre-failure condition with the roundsling by one or more of emitting an audible alarm, displaying a visible warning, and/or producing a tactile alarm.

In some aspects, the systems comprise a roundsling comprising a load-bearing core, a pre-failure indicator assembly comprising a dedicated strand having an eye-loop on each end joined together via one or more rings that fail at a load capacity that is less than the maximum load capacity of the load-bearing core. The ring preferably comprises one or more active RFID tags. The one or more RFID tags may optionally comprise a shield that blocks the signal transmitted from the RFID tag. If the shield is compromised, the signal may escape through the compromised area and the freed signal may be detected. Optionally, the systems may comprise an indicator yarn connected to the dedicated strand. The systems also comprise a RFID signal receiver.

The dedicated strand may comprise a plurality of RFID tags, or may comprise at least two, at least three, or at least four, or more than four RFID tags. The roundsling may comprise two or more RFID sensors. An indicator yarn may be attached to the dedicated strand, with an end portion of the indicator yarn exposed to the exterior of the cover.

The roundsling may be a one-path or two-path roundsling. In certain two-path roundslings, each path comprises a load-bearing core, a pre-failure indicator assembly comprising a dedicated strand positioned proximate to the core and having an eye-loop on each end joined together via one or more rings that fail at a load capacity that is less than the maximum load capacity of the load-bearing core, and having one or more RFID tags affixed to the dedicated strand, and one or more RFID sensors comprising a transmitter for sending a wireless signal to a RFID signal receiver.

BRIEF DESCRIPTION OF THE SEVERAL VIEWS OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Various terms relating to aspects of disclosure are used throughout the specification and claims. Such terms are to be given their ordinary meaning in the art, unless otherwise indicated. Other specifically defined terms are to be construed in a manner consistent with the definition provided herein.

The disclosure relates to systems and methods for determining whether an industrial roundsling may fail during use, for example, because load-bearing aspects of the roundsling have been overstretched or overloaded. A foundational feature includes radio frequency identification tags and sensors that convey information about the condition of the load-bearing aspects of the roundsling to a user. The roundslings may comprise the roundslings and the sacrificial ring-based pre-failure indicator systems of U.S. Pat. No. 7,661,737.

Figure 1A:
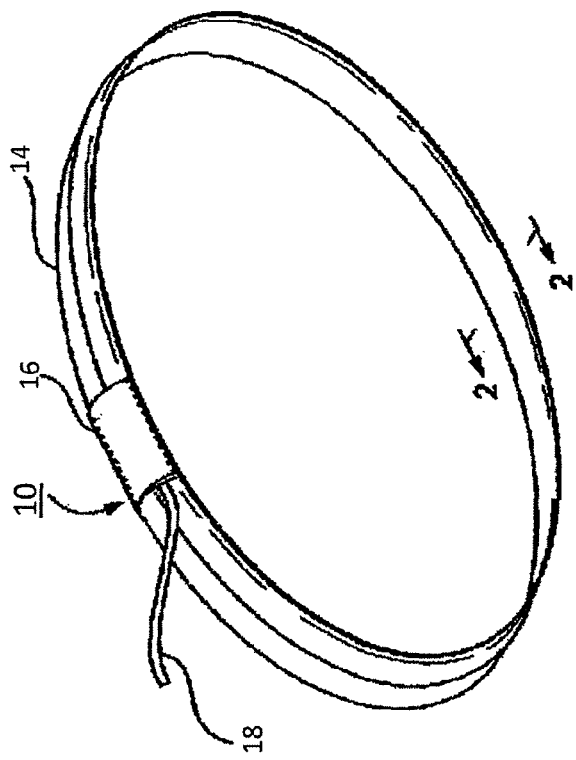
FIG. 1A shows a single-path roundsling having a pre-failure warning indicator.

FIG. 1A illustrates one non-limiting example of a single-path roundsling 10. The single-path roundsling 10 comprises a load-bearing core 12. The core 12 may be comprised of a plurality of strands 13 (FIG. 2), that may be fabricated from any suitable material, including metal or synthetic polymers or composite materials. The core 12 may comprise one or more natural or synthetic materials, such as polyester, polyethylene, nylon, K-Spec® (SlingMax, Inc., comprising a proprietary blend of fibers), high-modulus polyethylene (HMPE), liquid crystal polymer (LCP), aramid, para-aramid, or other suitable synthetic material. The material of the core 12 may relate to the maximum weight the sling 10 is designed to lift, and the environment in which the sling 10 will be used. In general, synthetic strands 13 have a high lifting and break strength, lighter weight, high temperature resistance and high durability, compared to wire rope or metal chain slings.

The core 12 is housed within a protective cover 14. The core 12 generally bears substantially the entire weight of the load to be lifted. The cover 14 generally prevents physical damage to the core 12, for example from abrasion, and sharp edges on the load, as well as protects the core 12 from exposure to harsh environmental conditions such as heat, humidity, ultraviolet light, corrosive chemicals, gaseous materials, or other environmental conditions that may damage or weaken the core 12 materials.

The single-path roundsling 10 may also comprise an indicator yarn 18, as well as a label 16. The cover 14 may comprise an opening through which the indicator yarn 18 may pass through, with a length of the yarn 18 and one terminal end thus located inside of the cover 14, and a length of the yarn 18 and the other terminal end thus located outside of the cover 14. The opening may be located underneath the label 16, but may be located at any suitable position in the cover 14. In aspects where the opening is positioned beneath the label 16, the yarn 18 may extend out from the label 16, with a length of one end portion extending freely beyond the surface of the cover 14. The yarn 18 preferably is of a bright color, including yellow, orange, red, or a combination thereof, or other suitable visible or contrasting color so that a user may monitor the visible end portion of the yarn 18. For example, in the event that the roundsling 10 is overstretched or overloaded, the visible portion of the yarn 18 may become shorter as the yarn 18 is pulled into the label 16, with the shortening of the visible section of the yarn 18 signaling the user that the roundsling 10 is overstretched or overloaded. In this sense, the indicator yarn 18 may serve as a redundancy for some embodiments of the RFID pre-failure warning systems 40 described below. As well, the indicator yarn 18 may comprise a component of such systems 40.

Figure 1B:
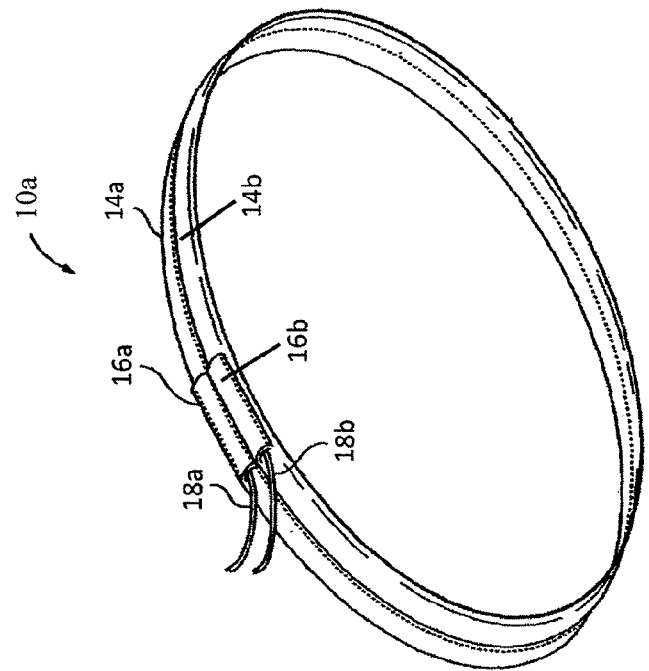
FIG. 1B shows a two-path roundsling having a pre-failure warning indicator.

FIG. 1B illustrates one non-limiting example of a two-path roundsling 10a. The basic features of a single-path roundsling 10 and a two-path roundsling 10a are generally the same, as shown in FIG. 1A and FIG. 1B. Thus, for example, a two-path roundsling 10a comprises two separate load-bearing cores 12 and 12a, two separate covers 14 and 14a, two separate labels 16 and 16a, and two separate indicator yarns 18 and 18a.

Figure 2:
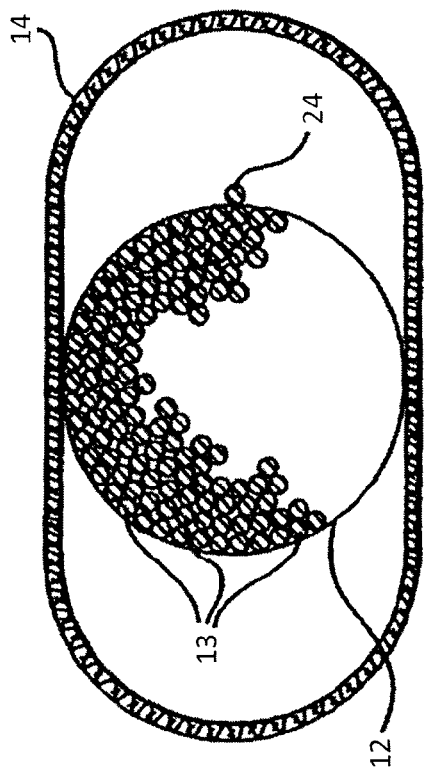
FIG. 2 shows a cross-sectional view of a protective cover and load-bearing core of a roundsling.

FIG. 2 shows a cross-sectional view of the roundsling 10 shown in FIG. 1A, taken along line 2-2. The cross-section shows the core 12 housed within the cover 14. The cross-section also shows the core 12 comprised of a plurality of strands 13. The strands 13 may be configured in a plurality of endless parallel loops of strands 13 to form a single core 12 or multiple cores (not shown), all of which are contained inside the cover 14. In some preferred aspects, the roundsling 10 comprises a dedicated strand 24 that is associated with the core 12, as described in more detail below. The dedicated strand 24 is preferably different from the strands 13 that make up the core 12, and the dedicated strand 24 may be part of a pre-failure indicator assembly 20.

Figure 3:
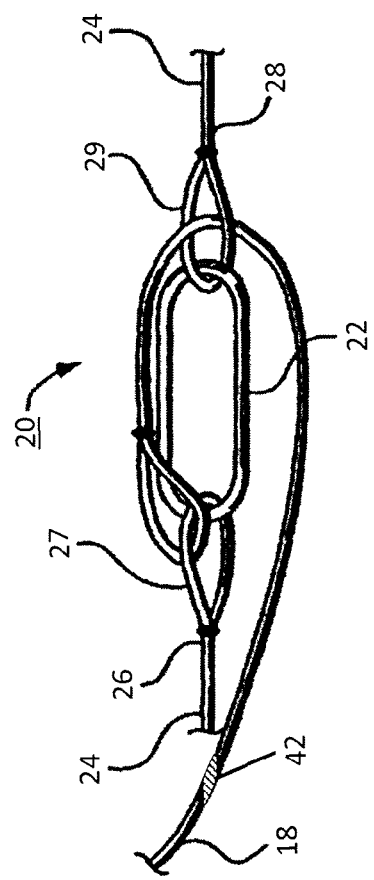
FIG. 3 shows a pre-failure indicator assembly.

A non-limiting example of the pre-failure indicator assembly 20 is shown in FIG. 3, illustrated as a side view and without the core 12 (shown without the core 12 for illustration purposes). The single-path roundsling 10 or the two-path roundsling 10a may comprise a pre-failure indicator assembly 20. Each path of a two path roundsling 10a may comprise its own pre-failure indicator assembly 20 and its respective components.

The pre-failure indicator assembly 20 comprises at least one dedicated strand 24, which comprises a first end 26 and a second end 28. The first end 26 comprises a first eye-loop 27, and the second end comprises a second eye-loop 29. The first eye-loop 27 and second eye loop 29 are preferably indirectly connected together with a ring 22. The ring 22 is between each of the first and second eye-loops 27 and 29, with each eye loop 27 and 29 and the ring 22 forming a chain-like connection. In some aspects, the indicator yarn 18 is connected to the pre-failure indicator assembly 20, for example, by connecting the yarn 18 to either the first eye-loop 27 or the second eye loop 29. The dedicated strand 24 is preferably made of the same material as the core strands 13, but may be made of a different material in some aspects.

The pre-failure indicator assembly 20 may be located underneath the cover 14, and may be located underneath the label 16. The dedicated strand 24 is preferably placed proximate the core 12, for example, the dedicated strand 24 may be twisted around one or more of the core strands 13, or the dedicated strand 24 may lay next to the core 12, as illustrated in FIG. 2. In some aspects, the dedicated strand 24 is affixed to the inside of the cover 14. When a roundsling 10 is used over a period of time, the cover 14 may develop wear points at specific locations, for example, where the roundsling 10 hangs from a crane's hook. Accordingly, it may be desirable to rotate the cover 14 with respect to the load-bearing core 12. By securing the dedicated strand 24 to the cover 14 interior, movement of the cover 14 (either intentionally or non-intentionally) will not affect the operation of the pre-failure indicator assembly 20.

When the first eye-loop 27 and second eye-loop 29 are connected together via the ring 22, the dedicated strand 24 plus the ring 22 form an endless loop. The shape of the separate dedicated strand 24 generally matches the shape of the endless parallel loops formed by the core strands 13 (e.g., generally circular or oval). The ring 22 may comprise any suitable shape.

Preferably, the ring 22 comprises a lower tensile strength than the core 12. For example, the ring 22 may be comprise of a different material than the core strands 13, or the ring 22 may comprise a plurality of frangible zones such as cuts or notches in the ring 22 that physically weaken it, or the ring 22 may comprise a smaller diameter than the core strands 13.

The pre-failure indicator assembly 20 is designed to trigger and thereby notify the rigger or other users of the roundsling 10 that the roundsling 10 has been over-stretched or overloaded (e.g., the roundsling 10 was subjected to a force that compromised its integrity), which may be about four times greater than the rated capacity of the roundsling 10. When the roundsling 10 is placed under a load that exceeds its recommended rating, the ring 22 will fail before damage can occur to either the core strands 13 (and therefore, the core 12) or the dedicated strand 24. When ring 22 fails, the first eye-loop 27 and the second eye-loop 29 begin moving in opposite directions, away from each other, and the physical distance between these eye-loops 27 and 29, as well as the first and second ends 26 and 28 of the dedicated strand 24 increases. In some aspects, the ring 22 will fail at about 70% to about 90% of the tensile strength (e.g., the maximum load-bearing capacity) of the core 12. In some preferred aspects, the ring 22 will fail at about 70%, about 75%, or about 80% of the tensile strength of the core 12. In general, the ring 22 is designed to fail before damage occurs to the core 12, thereby warning a user that they must either stop using the roundsling 10 in the manner in which they are using it or, if they continue, the roundsling 10 will be permanently damaged. Ring 22 failure includes, but is not limited to, breaking, pulverizing, stretching, or otherwise being compromised such that the ring 22 can no longer bridge the ends of the dedicated strand 24 together, or such that the ends of the dedicated strand 24 can no longer be maintained a certain distance apart.

In aspects where the pre-failure indicator assembly 20 includes an indicator yarn 18, as the eye-loops 27 and 29 move apart, the portion of the yarn 18 that extends beyond the label 16 and is visible to the user is drawn back inside the cover label 16 or the cover 14 until its end is no longer visible. If the terminal end of the yarn 18 is not visible, or if the visible end portion is otherwise noticeably shorter, an inspector or rigger will immediately be able to determine that the roundsling 10 may have overextended or overloaded.

Figure 4:
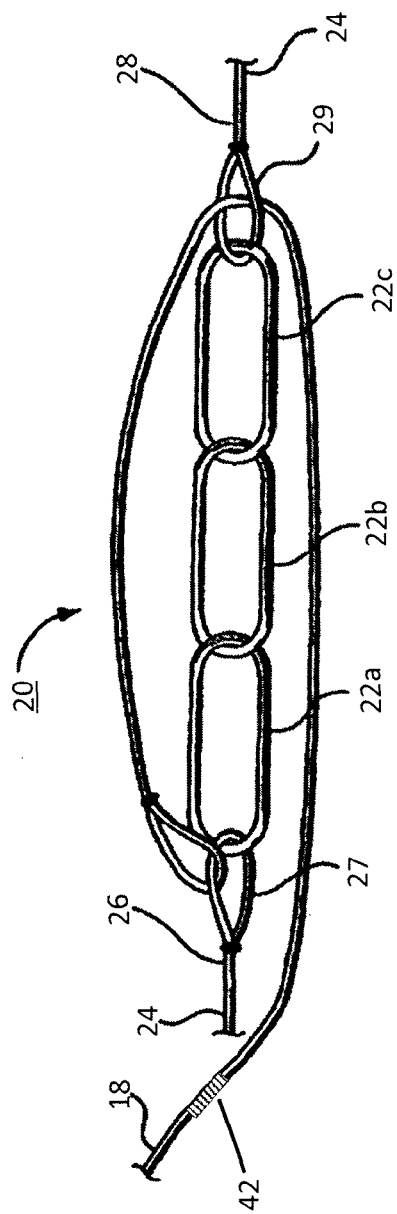
FIG. 4 shows a pre-failure indicator assembly utilizing multiple deforming rings linked together.
Figure 5:
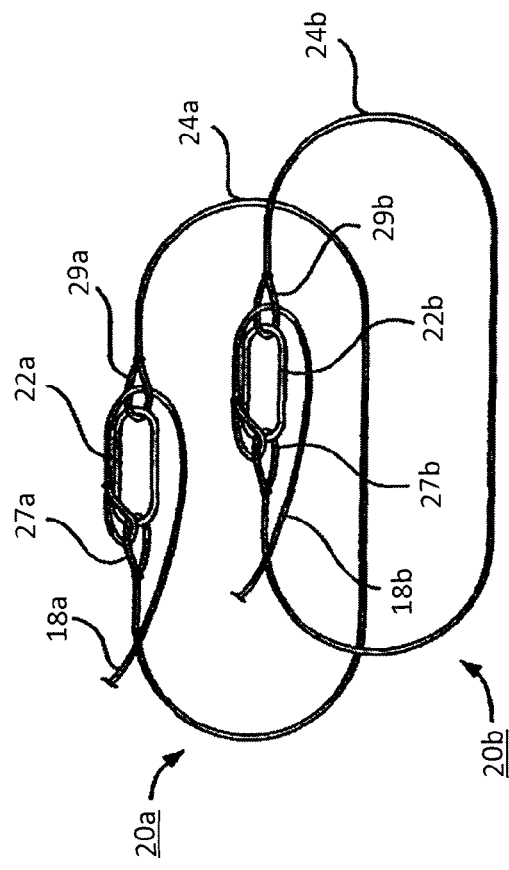
FIG. 5 shows a pre-failure indicator assembly for a two-path sling.

In some aspects, a pre-failure indicator assembly 20 includes a plurality of rings 22. For example, as shown in FIG. 4, the assembly 20 may include three rings, 22a, 22b, and 22c connected together between the first and second eye-loops 27 and 29. A two-path roundsling 10a may comprise two pre-failure indicator assemblies 20a and 20b, as shown in FIG. 5, with one assembly 20 for each sling path. The components of each pre-failure indicator assembly 20a and 20b are the same, as described above.

The roundsling 10 preferably comprises a RFID pre-failure warning system 40. The RFID pre-failure warning system 40 generally comprises one or more RFID tags 42, at least one RFID sensor 44, and at least one RFID signal receiver 46. The RFID sensor 44 generally functions to detect the RFID tag 42, for example, when the RFID tag 42 is brought into proximity of the RFID sensor 44 or otherwise passes by the RFID sensor 44, and once the RFID tag 42 is detected, the RFID sensor 44 transmits a signal that is to be received by the RFID signal receiver 46. The one or more RFID tags 42 may be a passive RFID tag 42, for example, an RFID tag 42 that does not include its own power source, but may include components that generate a current to power the RFID tag 42 when such components are brought into proximity of emissions from the RFID sensor 44. The one or more RFID tags 42 may be an active RFID tag 42 or a semi-passive RFID tag 42, which each may include a power source, preferably a battery, to power the RFID tag 42. An active RFID tag 42 may utilize its power source to transmit a signal, and a semi-passive RFID tag 42 may use emissions from the RFID sensor 44 to transmit a signal. An RFID tag 42 may comprise a shield 43s that blocks the signal, which may be helpful, for example, in an embodiment in which the RFID tag 42 is active, and it is desired to detect the signal only when the shield 43s is compromised as an indicator that one or more components of the roundsling 10 (e.g., core strand 13, core 12, pre-failure indicator assembly 20, ring 22, etc.) have been damaged such that the roundsling 10 is in danger of failure.

Figure 6A:
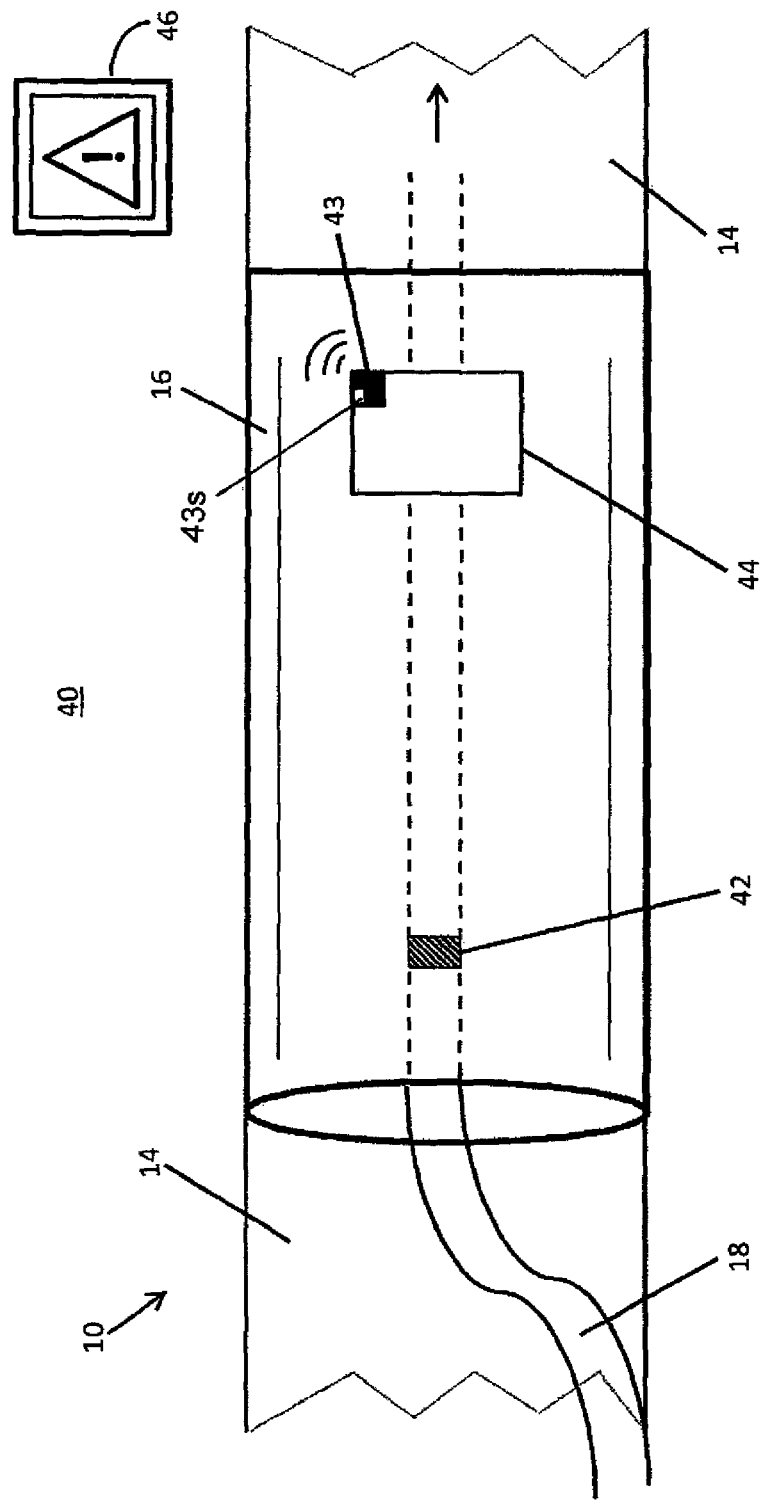
FIG. 6A shows a pre-failure RFID warning indicator system for a single-path roundsling with a partial fragmentary view of a shield and transceiver.
Figure 6B:
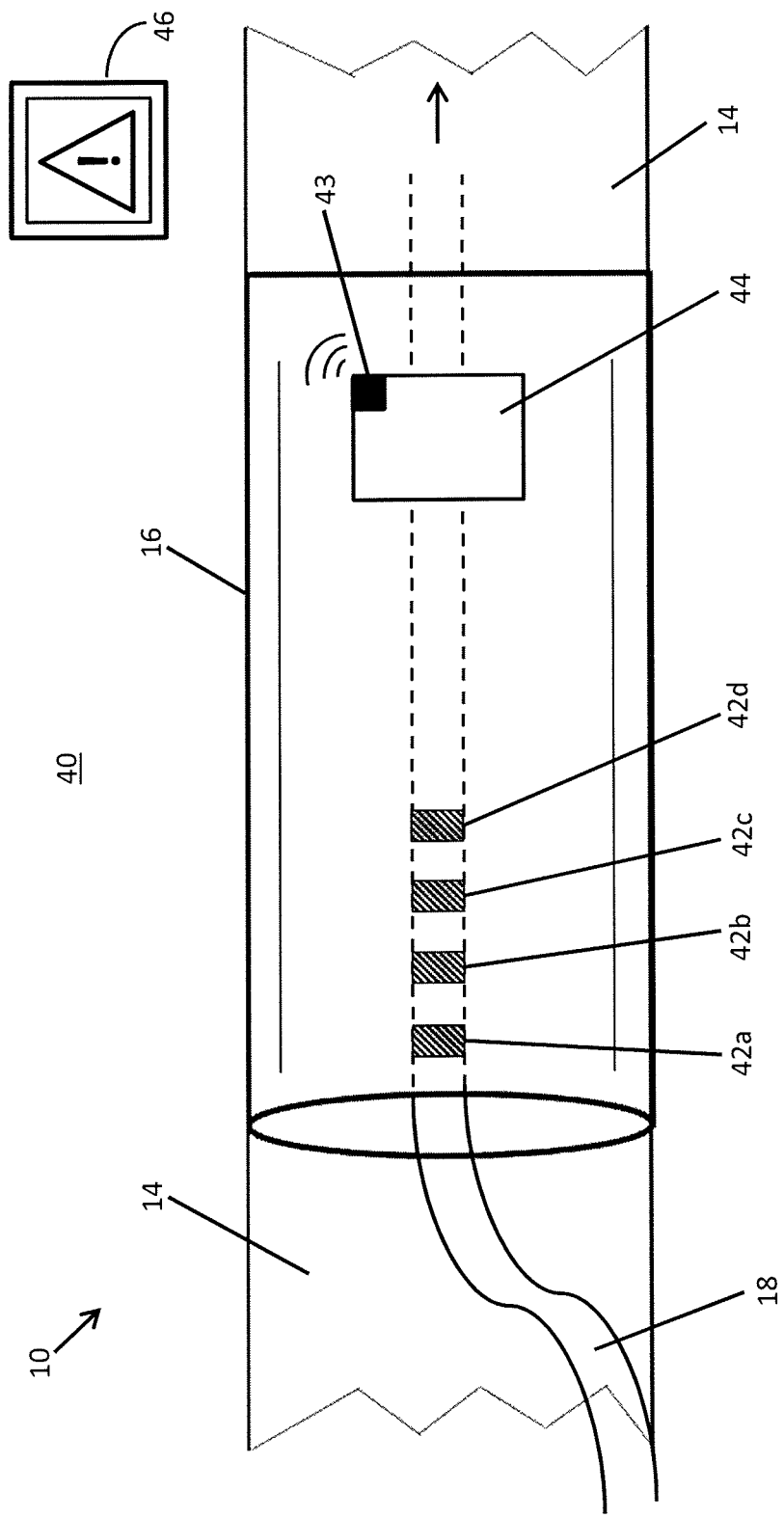
FIG. 6B shows a pre-failure RFID warning indicator system for a single-path roundsling, having a plurality of RFID tags.
Figure 6C:
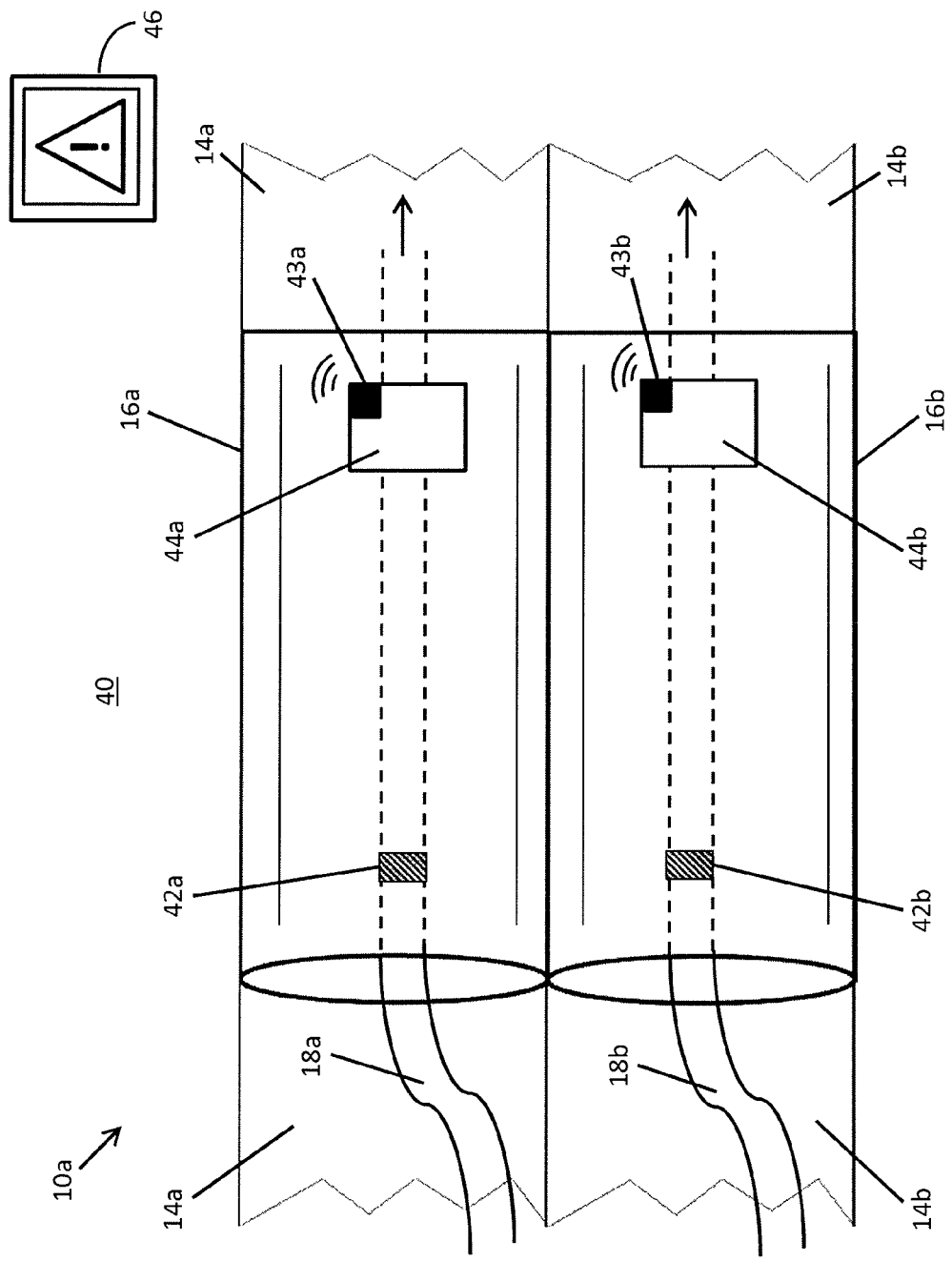
FIG. 6C shows a pre-failure RFID warning indicator system for a two-path roundsling.

One non-limiting example of a RFID pre-failure warning system 40 is shown in FIG. 6A through FIG. 6C. As shown in FIG. 6A, the RFID pre-failure warning system 40 may be situated at the label 16 area of the roundsling 10 or 10a, although the pre-failure warning system 40 may be positioned anywhere around the circumference of the roundsling 10 or 10a. In the embodiment shown, the indicator yarn 18 forms a part of the RFID pre-failure warning system 40, and the RFID tag 42 is affixed to the indicator yarn 18. The indicator yarn 18 may, but need not be, connected to a pre-failure indicator assembly 20 (not shown), as described above. The RFID sensor 44 comprises a transmitter 43 or transceiver 43 that is capable of emitting a wireless signal, which signal sends information concerning the condition of the roundsling 10. Preferably, the RFID sensor 44 is affixed to the label 16, although the RFID sensor 44 may be affixed to the cover 14, in which case the RFID sensor 44 may be on the interior or exterior of the cover 14, so long as the RFID sensor 44 may detect the RFID tag 42.

When the roundsling 10 is not overloaded or overstretched, an end portion of the indicator yarn 18 extends out from the label 16 and is visible outside of the roundsling 10. The RFID tag 42 may be affixed at any location in the yarn 18 downstream of the RFID sensor 44 suitable to indicate that the sling 10 is being stressed (downstream in this case refers to a portion of the yarn 18 between the external terminal end and the RFID sensor 44). As shown, the RFID tag 42 is located on a section of the yarn 18 below the label 16. When the roundsling 10 is overloaded or overstretched, the indicator yarn 18 is pulled upstream, with the length of the end portion of the yarn 18 visible from the outside of the roundsling 10 shortening and eventually disappearing from view as the yarn 18 is retracted into the label 16. As the yarn 18 is pulled upstream (direction of the arrow), the RFID tag 42 is also pulled upstream, and if the RFID tag 42 is pulled far enough upstream, the RFID tag 42 passes by the RFID sensor 44. When the RFID tag 42 passes by the RFID sensor 44, the RFID sensor 44 sends a warning signal to the RFID signal receiver 46. The RFID sensor 44 may send the signal through the transmitter 43 or transceiver 43. The signal preferably is a wireless signal.

The RFID signal receiver 46 may comprise a hand-held device. The RFID signal receiver 46 indicates to a user that a warning signal has been triggered, meaning that the roundsling 10 has been overloaded or overstretched and that if the situation is not mitigated or remedied, the roundsling may fail 10. The RFID signal receiver 46 may, for example, warn a user through an audible alarm, a visible warning, and/or a tactile alarm such as vibration. Having received the warning signal from the RFID signal receiver 46, the user may take corrective action.

In some aspects, the RFID pre-failure warning system 40 may comprise a plurality of RFID tags 42. A non-limiting example of four RFID tags 42a, 42b, 42c, and 42d is shown in FIG. 6B. Any suitable number of RFID tags 42 may be used, including two, three, four, five, six, seven, eight, nine, ten, or more RFID tags 42.

As for an embodiment in which one RFID tag 42 is used (e.g., FIG. 6A), in embodiments in which a plurality of RFID tags 42 is used, when the roundsling 10 is not overloaded or overstretched, the end portion of the indicator yarn 18 extends out from the label 16 and is visible outside of the roundsling 10. The plurality of RFID tags 42 may be affixed at any locations in the yarn 18 suitable to indicate that the sling 10 is being stressed. Each of the plurality of RFID tags 42 may be evenly spaced apart, or may be spaced apart at desired distances that are not necessarily equal among the tags 42. When the roundsling 10 is overloaded or overstretched, the indicator yarn 18 is pulled upstream, with the length of the yarn 18 visible from the outside of the roundsling 10 shortening and eventually disappearing from view as the yarn 18 is retracted into the label 16. As the yarn 18 is pulled upstream (direction of the arrow), the plurality of RFID tags 42 is also pulled upstream. When the RFID tag 42 most proximal to the RFID sensor 44 is pulled far enough upstream, this RFID tag 42 passes by the RFID sensor 44, and this is repeated for each successive RFID tag 42 until the downstream-most RFID tag 42 passes by the RFID sensor 44.

Successive downstream RFID tags 42 may indicate progressively higher degrees of overloading or overstretching of the roundsling 10. For example, as the degree of overloading or overstretching increases, the indicator yarn 18 will be pulled further upstream, thereby allowing more and more downstream RFID tags 42 to pass by the RFID sensor 44. In this case, the RFID sensor 44 may send different warning signals to the RFID signal receiver 46. The RFID signal receiver may then indicate to a user the different levels of warning signals that reflect the degree of stress on the roundsling 10. For example, warning signals may range from passing the maximum load capacity or rating for the roundsling 10 up to imminent failure. The RFID signal receiver 46 may, for example, warn a user through an audible alarm, a visible warning, and/or a tactile alarm such as vibration. Having received the warning signal from the RFID signal receiver 46, the user may take corrective action, which may be based on the degree of stress to the roundsling 10.

The RFID pre-failure warning system 40 may also be used with a two-path roundsling 10a, for example, as shown in FIG. 6C. The components of each pre-failure warning system 40 for each sling path are identical, and are shown with an "a" or "b" designation in FIG. 6C. In the system 40 shown in FIG. 6C, only a single RFID signal receiver 46 is shown, with this receiver 46 capable of receiving a warning signal from either or both of the RFID sensors 44a and 44b. Although not shown, the RFID pre-failure warning system 40 used in a two-path roundsling 10a may utilize a plurality of RFID tags 42, as shown in FIG. 6B.

Figure 7A:
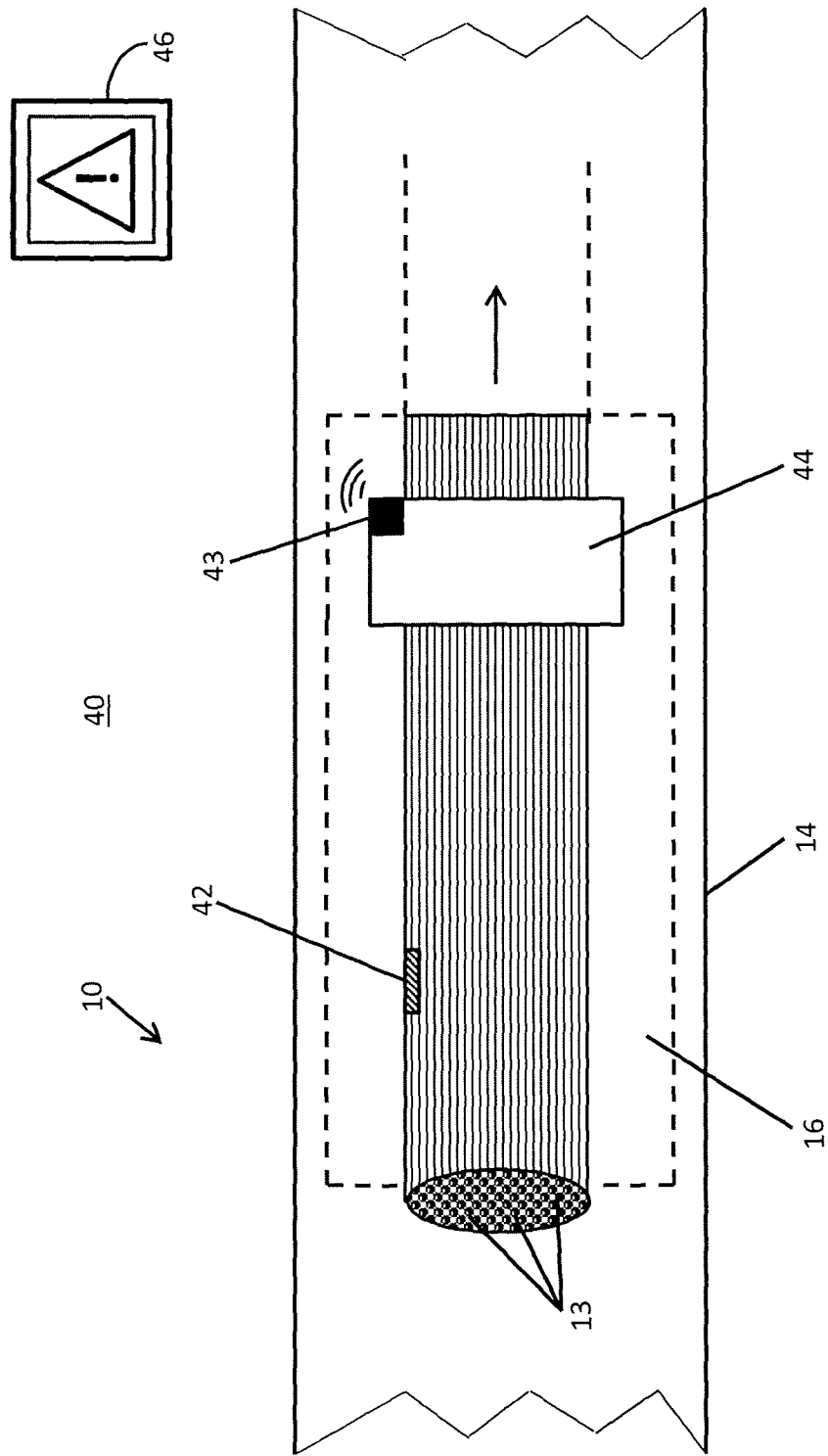
FIG. 7A shows a RFID tag affixed to a strand of the roundsling core.
Figure 7B:
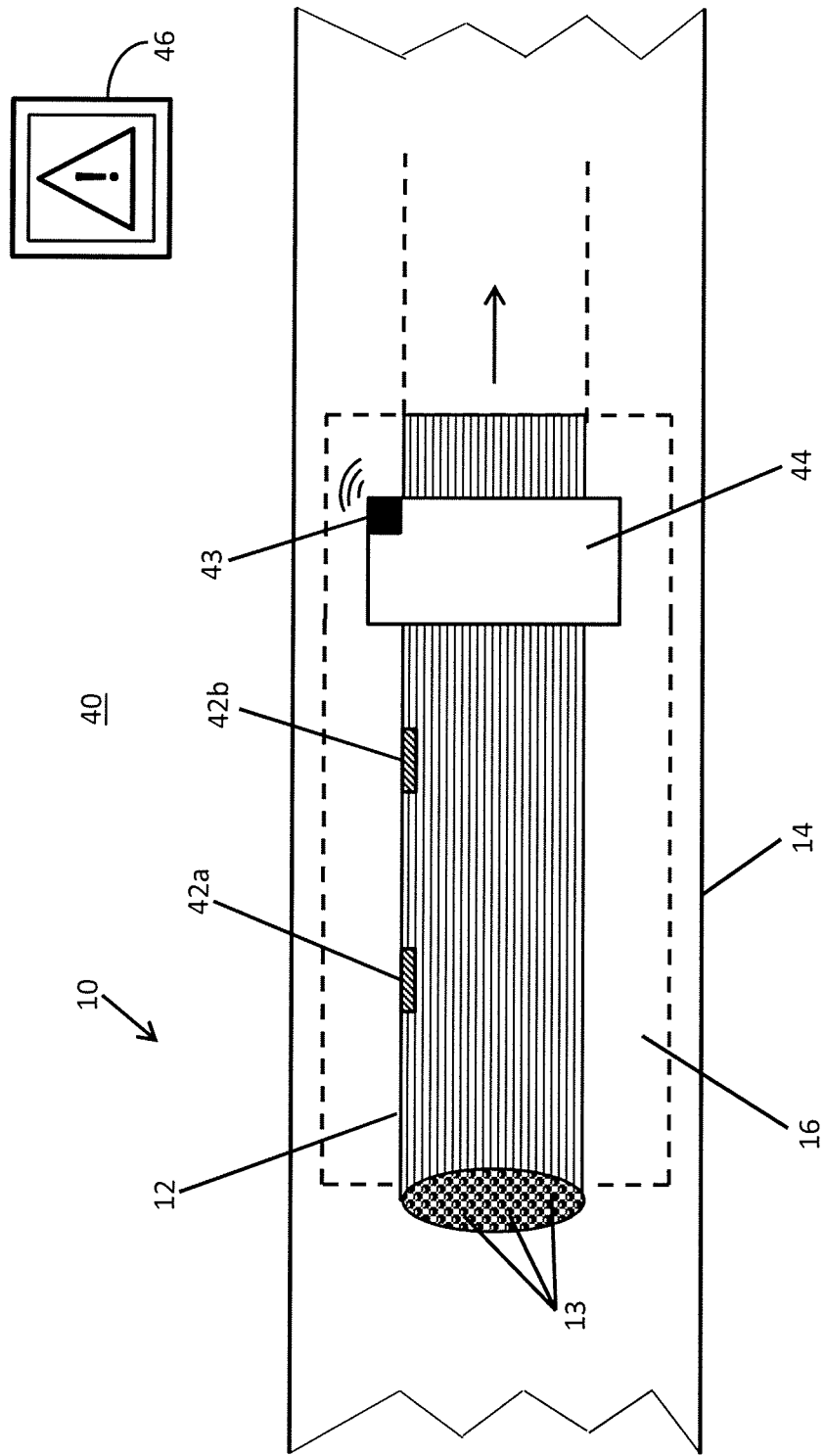
FIG. 7B shows a plurality of RFID tags affixed to a strand of the roundsling core.
Figure 7C:
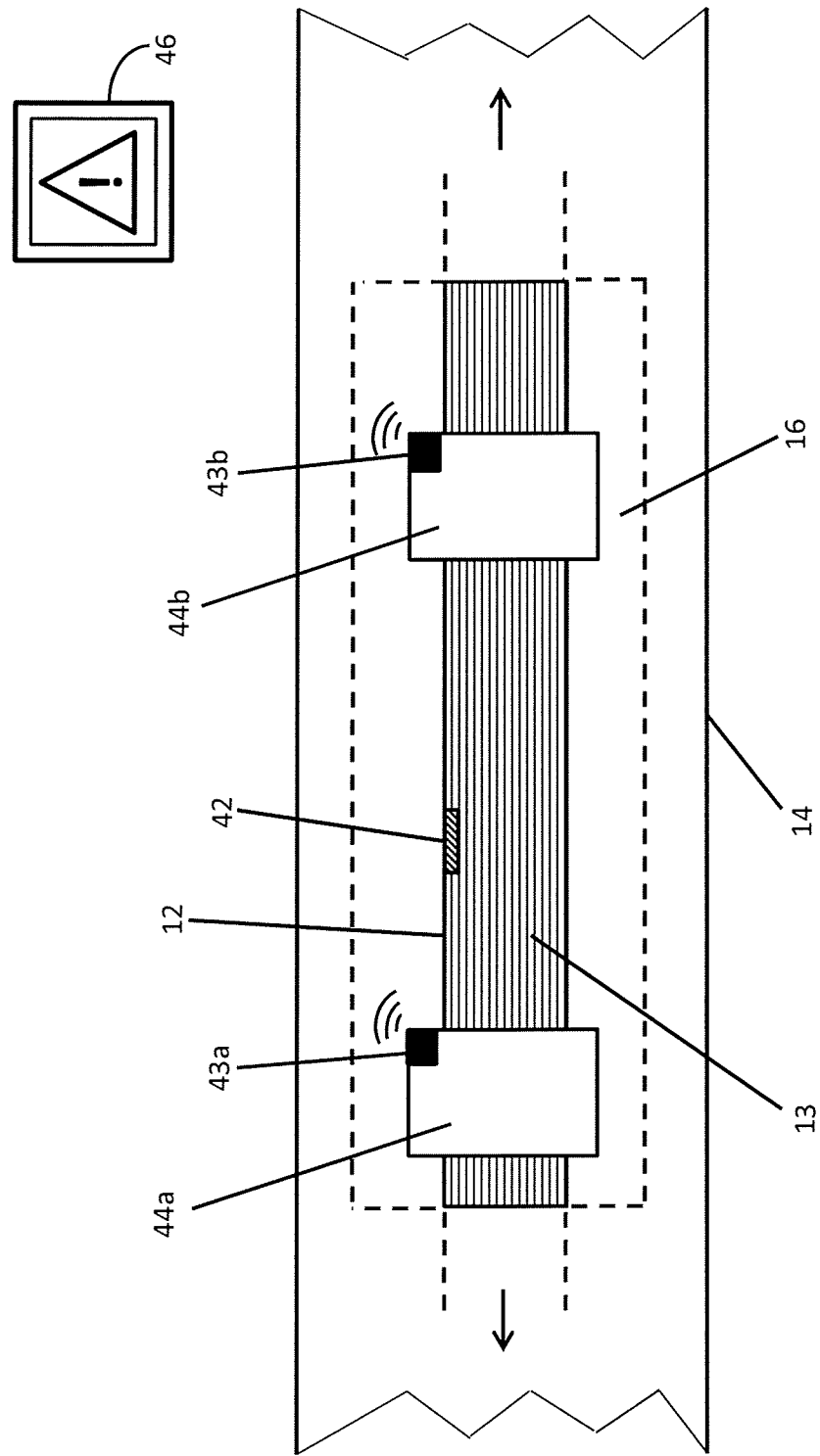
FIG. 7C shows two RFID sensors flanking an RFID tag affixed to a core strand.

In FIG. 6A through FIG. 6C, the RFID pre-failure warning system 40 affixes the RFID tag(s) 42 to the indicator yarn 18. It is not necessary, however, that the RFID tag(s) 42 be affixed to the indicator yarn 18. In some aspects, the RFID tag(s) 42 may be affixed to one or more of the strands 13 of the core 12, as shown in FIG. 7A through FIG. 7C. The RFID tag(s) 42 may be affixed to the core strands 13 in addition to the indicator yarn 18 (if present), or instead of the indicator yarn 18. The RFID pre-failure warning system 40 embodiments shown in FIG. 7A through FIG. 7C operate based on the same principles under which the embodiments shown in FIG. 6A through FIG. 6C operate. The RFID pre-failure warning system 40 shown in FIG. 7A through FIG. 7C may also be used with a two-path roundsling 10a (not shown).

In FIG. 7A, a partial cut-away view of a roundsling 10 is shown, with the core 12 exposed (and for purposes of illustrating the core strands 13, a cross-section of the core 12 is also shown) beneath the label 16. As shown, the RFID tag 42 is affixed to one of the core strands 13 just downstream of the RFID sensor 44 (downstream in this case refers to the left side of the image of the RFID sensor 44). When the core 12 of the roundsling 10 is overloaded or overstretched, the portion of the strand 13 to which the RFID tag is affixed moves upstream, and if the core 12 moves far enough, the RFID tag 42 passes by the RFID sensor 44. When the RFID tag 42 passes by the RFID sensor 44, the RFID sensor 44 sends a warning signal to the RFID signal receiver 46. The RFID sensor 44 may send the signal through the transmitter 43 or transceiver 43.

Although FIG. 7A shows the relative position of the RFID tag 42 to the left side of the RFID sensor 44, the RFID tag 42 may in the alternative be positioned to the right side of the RFID sensor 44 (not shown), in which case, when the core 12 of the roundsling 10 is overloaded or overstretched, the portion of the strand 13 to which the RFID tag is affixed moves downstream, and if the core 12 moves far enough, the RFID tag 42 passes by the RFID sensor 44, thereby triggering the warning signal. Similarly, two RFID sensors 44a and 44b may be used, with one RFID sensor 44a positioned to the left side of the RFID tag 42, and one RFID sensor 44b positioned to the right side of the RFID tag (FIG. 7C). This configuration provides for movement of an overstretched or overloaded core 12 in either direction, thereby triggering the warning signal. Each RFID sensor 44a and 44b comprises a transmitter 43a and 43b or transceiver 43a and 43b.

In some aspects, a plurality of RFID tags 42 may be affixed to a core strand 13, as shown in FIG. 7B. FIG. 7B shows a non-limiting example of two RFID tags 42, although three, four, five, six, seven, eight, nine, ten, or more RFID tags 42 may be used. The plurality of RFID tags 42 may be affixed at any locations in the core strand 13 suitable to indicate that the sling 10 is being stressed. Each of the plurality of RFID tags 42 may be evenly spaced apart, or may be spaced apart at desired distances that are not necessarily equal among the tags 42. As the core strands 13 are moved, the plurality of RFID tags 42 is also moved. When the RFID tag 42 most proximal to the RFID sensor 44 is moved far enough, this RFID tag 42 passes by the RFID sensor 44, and this is repeated for each successive RFID tag 42 until the RFID tag 42 originally located most distally from the RFID sensor 44 passes by the RFID sensor 44.

Successive downstream RFID tags 42 may indicate progressively higher degrees of overloading or overstretching of the roundsling 10. For example, as the degree of overloading or overstretching increases, the core strands 13 move further, thereby allowing more and more downstream RFID tags 42 to pass by the RFID sensor 44. In this case, the RFID sensor 44 may send different warning signals to the RFID signal receiver 46. The RFID signal receiver may then indicate to a user the different levels of warning signals that reflect the degree of stress on the roundsling 10. For example, warning signals may range from passing the maximum load capacity or rating for the roundsling 10 up to imminent failure. The RFID signal receiver 46 may, for example, warn a user through an audible alarm, a visible warning, and/or a tactile alarm such as vibration. Having received the warning signal from the RFID signal receiver 46, the user may take corrective action, which may be based on the degree of stress.

Figure 8A:
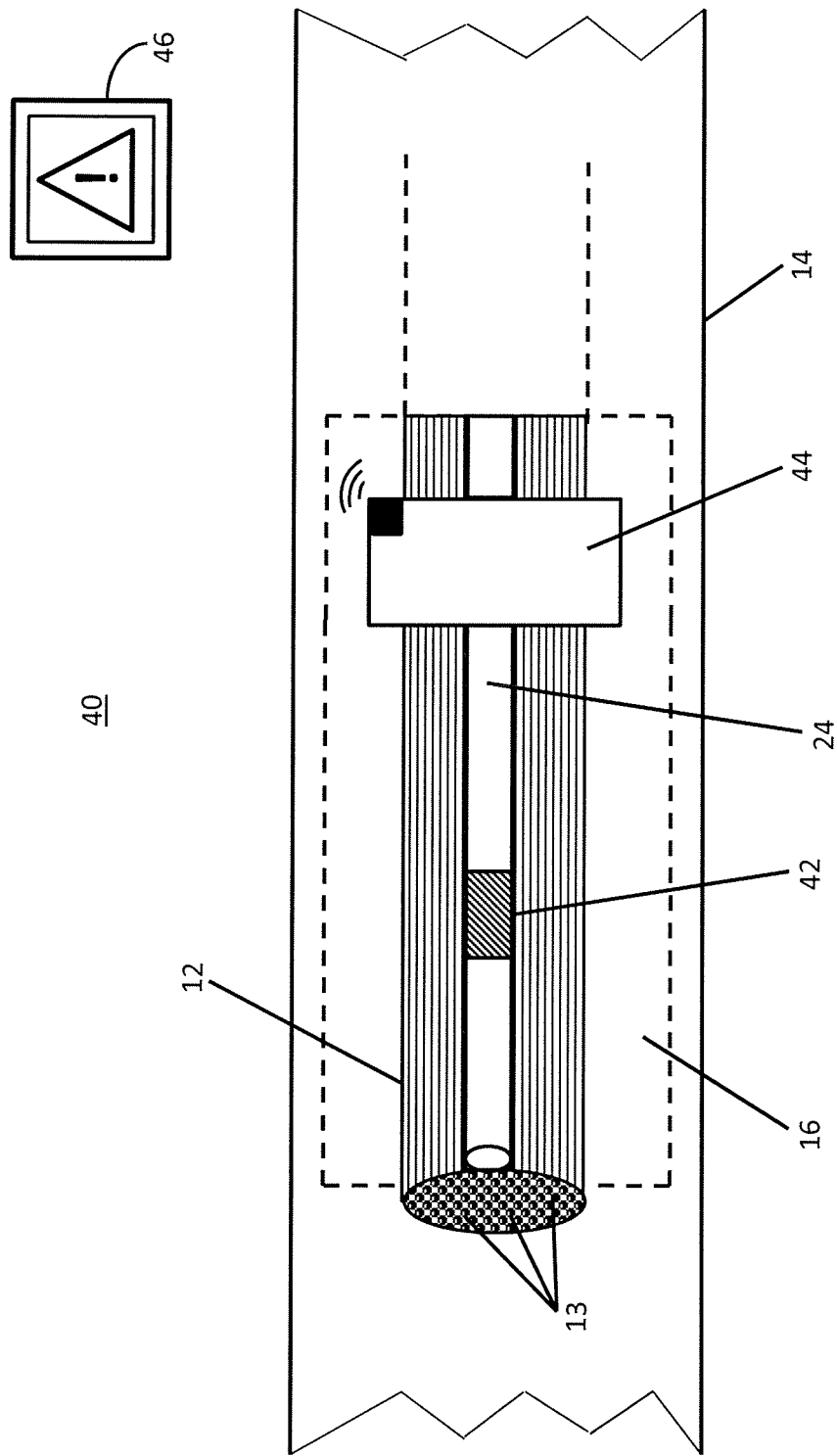
FIG. 8A shows a RFID tag affixed to the dedicated strand.
Figure 8B:
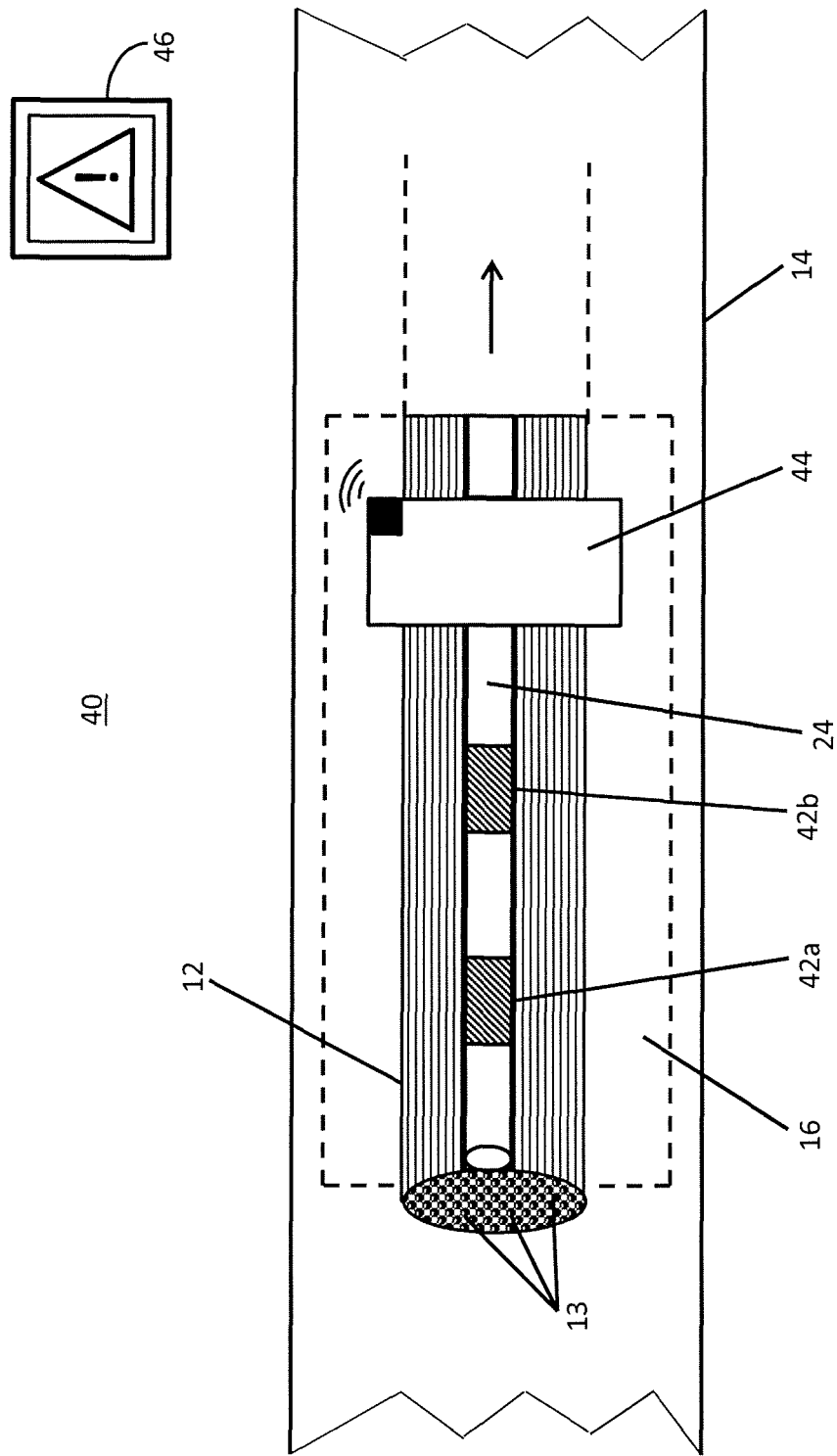
FIG. 8B shows a plurality of RFID tags affixed to the dedicated strand.
Figure 8C:
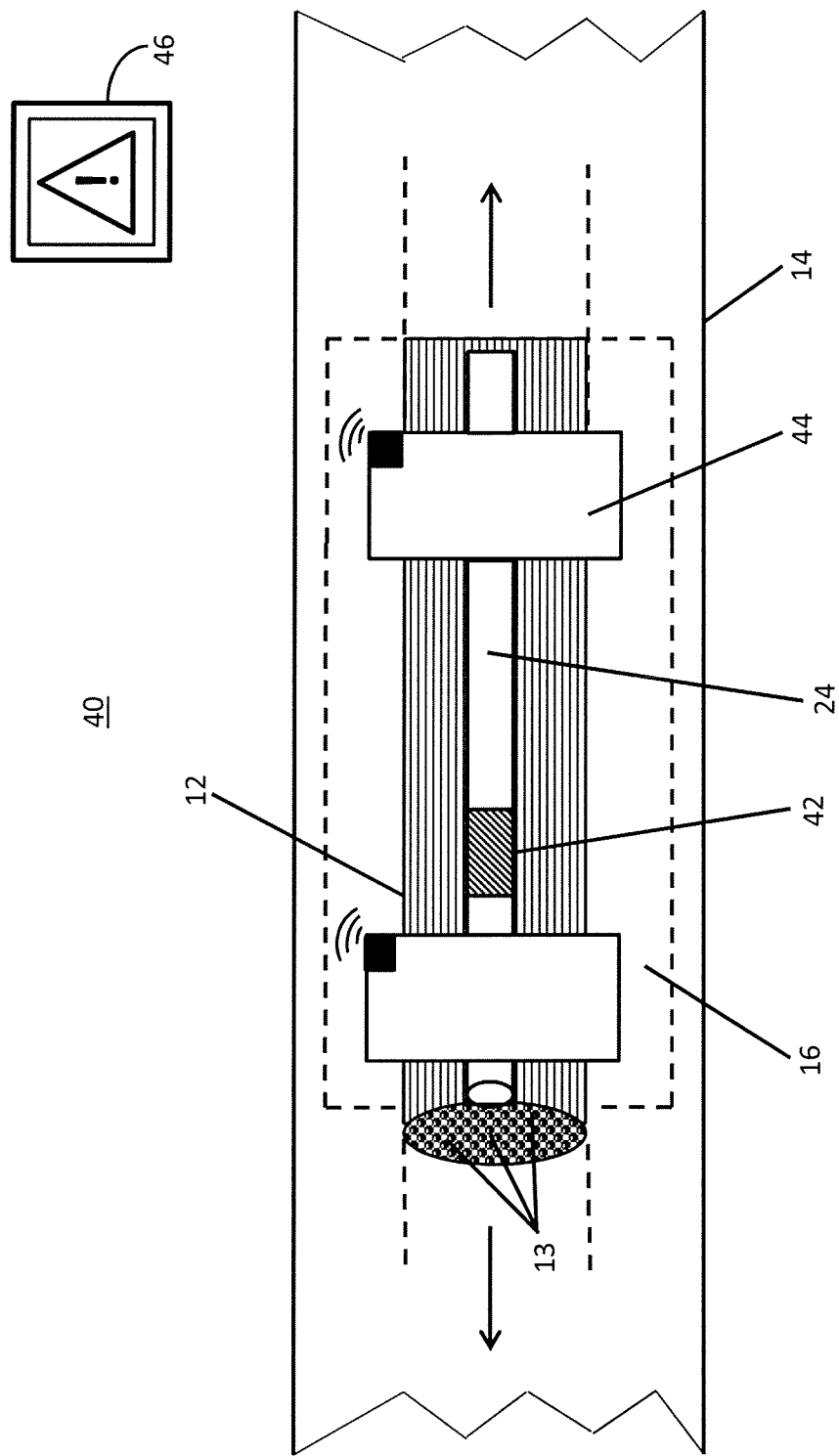
FIG. 8C shows two RFID sensors flanking an RFID tag affixed to the dedicated strand.

The RFID pre-failure warning system 40 shown in FIG. 7A through FIG. 7C may be used in addition to the RFID pre-failure warning system 40 shown in FIG. 6A through FIG. 6C and shown in FIG. 8A through FIG. 8C, for example, as a form of a redundancy, or may be used independently of such systems, as a stand-alone system. The RFID pre-failure warning system 40 shown in FIG. 7A through FIG. 7C may be used with a two-path roundsling 10a, with each path having a set of components of the RFID pre-failure warning system 40.

In some aspects, the RFID tag(s) 42 are not affixed to the indicator yarn 18 or to the core strands 13, and instead, are affixed to the dedicated strand 24, as shown in FIG. 8A through FIG. 8C. The RFID pre-failure warning system 40 embodiments shown in FIG. 8A through FIG. 8C operate based on the same principles under which the embodiments shown in FIG. 6A through FIG. 7C operate.

In FIG. 8A, a partial cut-away view of a roundsling 10 is shown, with the core 12 exposed (and for purpose of illustrating the core strands 13 and the dedicated strand 24, a cross-section of the core 12 and the dedicated strand 24 is also shown) beneath the label. As shown, the RFID tag 42 is affixed to the dedicated strand 24 just downstream of the RFID sensor 44 (downstream in this case refers to the left side of the image of the RFID sensor 44). When the core 12 of the roundsling 10 is overloaded or overstretched, the ring 22 (not shown) to which the dedicated strand 24 is attached becomes compromised, thereby allowing the dedicated strand 24 to move upstream, and if the dedicated strand 24 moves far enough, the RFID tag 42 passes by the RFID sensor 44. When the RFID tag 42 passes by the RFID sensor 44, the RFID sensor 44 sends a warning signal to the RFID signal receiver 46. The RFID sensor 44 may send the signal through the transmitter 43 or transceiver 43.

Although FIG. 8A shows the relative position of the RFID tag 42 to the left side of the RFID sensor 44, the RFID tag 42 may in the alternative be positioned to the right side of the RFID sensor 44 (not shown), in which case, when the core 12 of the roundsling 10 is overloaded or overstretched, the portion of the dedicated strand 24 to which the RFID tag is affixed moves downstream, and if the dedicated strand 24 moves far enough, the RFID tag 42 passes by the RFID sensor 44, thereby triggering the warning signal. Similarly, two RFID sensors 44a and 44b may be used, with one RFID sensor 44a positioned to the left side of the RFID tag 42, and one RFID sensor 44b positioned to the right side of the RFID tag (FIG. 8C). This configuration provides for movement of the dedicated strand 24 in either direction, thereby triggering the warning signal. Each RFID sensor 44a and 44b comprises a transmitter 43a and 43b or transceiver 43a and 43b.

In some aspects, a plurality of RFID tags 42 may be affixed to the dedicated strand 24, as shown in FIG. 8B. FIG. 8B shows a non-limiting example of two RFID tags 42, although three, four, five, six, seven, eight, nine, ten, or more RFID tags 42 may be used. The plurality of RFID tags 42 may be affixed at any locations in the dedicated strand 24 suitable to indicate that the roundsling 10 is being stressed. Each of the plurality of RFID tags 42 may be evenly spaced apart, or may be spaced apart at desired distances that are not necessarily equal among the tags 42. As the dedicated strand 24 moves, the plurality of RFID tags 42 affixed to the dedicated strand 24 also moves. When the RFID tag 42 most proximal to the RFID sensor 44 is moved far enough, this RFID tag 42 passes by the RFID sensor 44, and this is repeated for each successive RFID tag 42 until the RFID tag 42 originally located most distally from the RFID sensor 44 passes by the RFID sensor 44.

Successive downstream RFID tags 42 may indicate progressively higher degrees of overloading or overstretching of the roundsling 10. For example, as the degree of overloading or overstretching increases, the dedicated strand 24 moves further, thereby allowing more and more RFID tags 42 to pass by the RFID sensor 44. In this case, the RFID sensor 44 may send different warning signals to the RFID signal receiver 46. The RFID signal receiver may then indicate to a user the different levels of warning signals that reflect the degree of stress on the roundsling 10. For example, warning signals may range from passing the maximum load capacity or rating for the roundsling 10 up to imminent failure. The RFID signal receiver 46 may, for example, warn a user through an audible alarm, a visible warning, and/or a tactile alarm such as vibration. Having received the warning signal from the RFID signal receiver 46, the user may take corrective action, which may be based on the degree of stress.

Figure 9A:
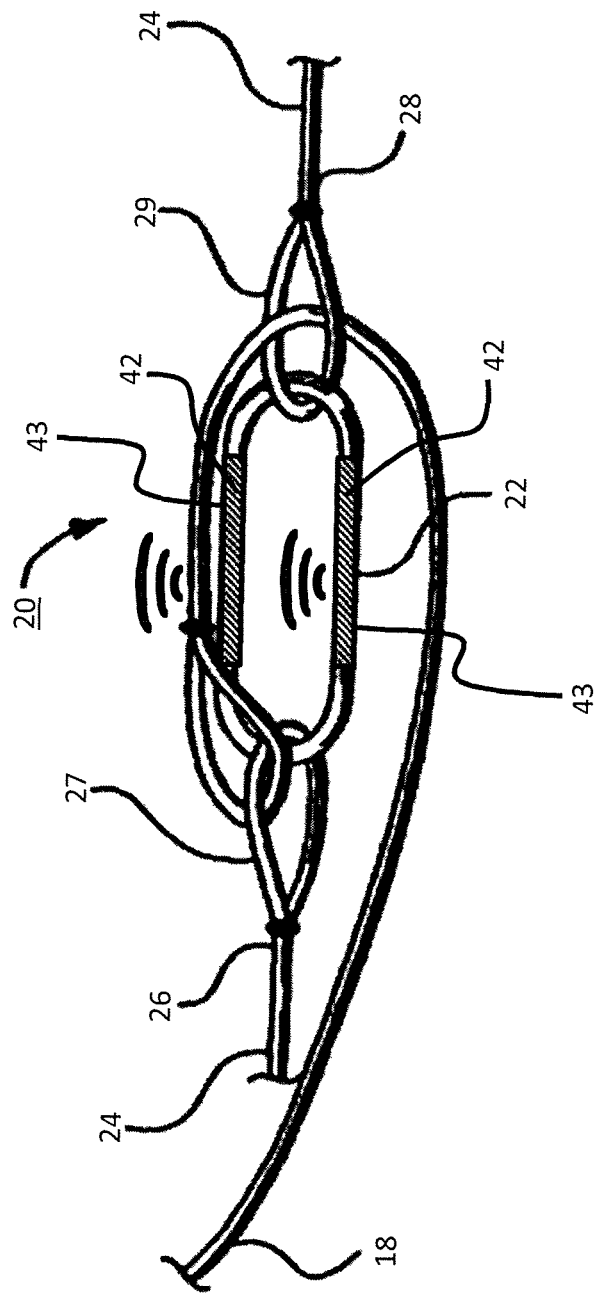
FIG. 9A shows a pre-failure indicator assembly using a single deforming ring comprising one or more large RFID tags.
Figure 9B:
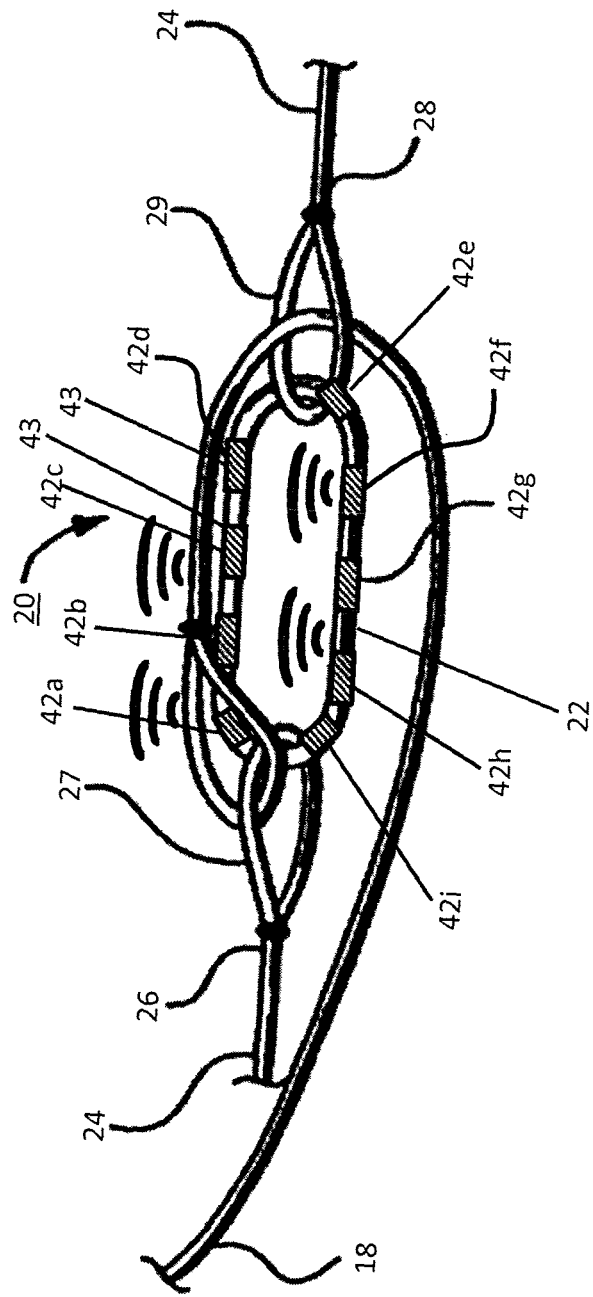
FIG. 9B shows a pre-failure indicator assembly using a single deforming ring comprising a plurality of small RFID tags around the perimeter of the ring, and shows an optional RFID tag shield.

In some aspects, the pre-failure indicator assembly 20 includes one or more RFID tags 42 (FIG. 9A and FIG. 9B). Preferably, the ring 22 comprises the one or more RFID tags 42, for example, as integral with the ring 22 or as affixed to the ring. As described above, the ring 22 comprises a lower tensile strength than the core 12, or the ring 22 may comprise a plurality of frangible zones such as cuts or notches in the ring 22 that physically weaken it, or the ring 22 may comprise a smaller diameter than the core strands 13. When the roundsling 10 is placed under a load that exceeds its recommended rating, the ring 22 will fail before the core strands 13, the core 12, or the dedicated strand 24 fails. When the ring 22 fails, the one or more RFID tags 42 fail such that the RFID sensor 44 sends a warning signal to the RFID signal receiver 46.

In such aspects, it is preferable that the one or more RFID tags 42 are active RFID tags 42 and, therefore, include their own power source (not shown) that drives the RFID signal. In one embodiment, the RFID tag 42 continuously transmits a signal, which is detected by the RFID signal receiver 46. In this case, the RFID signal receiver 46 indicates to a user that the RFID signal is active, and as long as the signal is active, the ring 22 has not failed. But when the ring 22 fails, the RFID tag 42 is compromised such that it can no longer transmit a signal. The cessation of the signal is detected by the RFID signal receiver 46, thereby indicating that the ring 22 has failed. The RFID signal receiver 46 may then warn a user through an audible alarm, a visible warning, and/or a tactile alarm such as vibration. Having received the warning signal from the RFID signal receiver 46, the user may take corrective action.

In one embodiment, the one or more RFID tags 42 are active RFID tags 42, but are encased in a shield, for example, an aluminum shield 43s or shield of other suitable material (which are known in the art), that blocks its signal. Thus, the RFID tag 42 continuously transmits a signal, but this signal is blocked such that it is not detected by the RFID signal receiver 46. In this case, the RFID signal receiver 46 indicates to a user that there is no RFID signal, and as long as the signal is not detected, the ring 22 has not failed. But when the ring 22 fails, the shield 43s of the RFID tag 42 is compromised such that the signal is no longer blocked. In this embodiment, at least one of the one or more RFID tags 42 is not compromised along with the ring 22 such that the RFID tag 42 may still transmit the signal, which may freely pass through the compromised shield 43s. The freed signal is detected by the RFID signal receiver 46, thereby indicating that the ring 22 has failed. The RFID signal receiver 46 may then warn a user through an audible alarm, a visible warning, and/or a tactile alarm such as vibration. Having received the warning signal from the RFID signal receiver 46, the user may take corrective action.

Figure 9C:
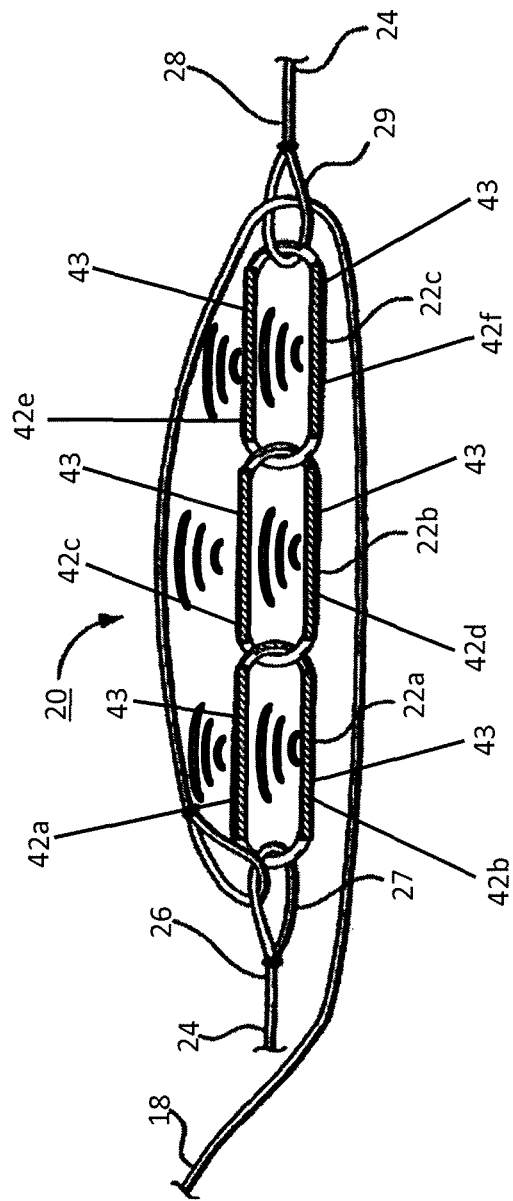
FIG. 9C shows a pre-failure indicator assembly as shown in FIG. 9A, but which employs multiple deforming rings comprising an RFID tag.

In some aspects, a pre-failure indicator assembly 20 includes a plurality of rings 22. For example, as shown in FIG. 9C and FIG. 9D, the assembly 20 may include three rings, 22a, 22b, and 22c connected together between the first and second eye-loops 27 and 29. Each ring 22 among the plurality of rings 22 may comprise one or more RFID tags 42, which preferably are active RFID tags 42. When a plurality of rings 22 is employed, the operation of the warning signal is the same as described above for the single ring 22 embodiment. For example, the failure of one or more rings 22 in the plurality may compromise the RFID tag 42, thereby ceasing the RFID signal, indicating that one or more rings 22 have failed. Alternatively, the failure of one or more rings 22 in the plurality may compromise the RFID tag shield 43s, allowing the RFID signal to pass through the compromised shield 43s, thereby allowing the signal to be detected, indicating that one or more rings 22 have failed.

Figure 9E:
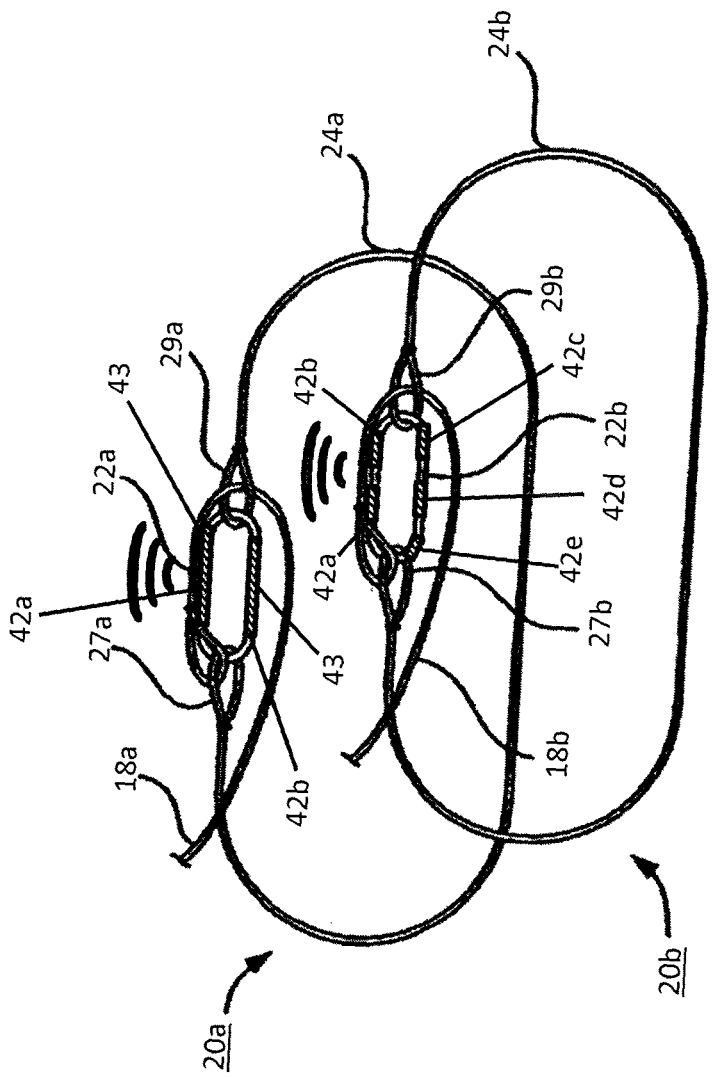
FIG. 9D shows a pre-failure indicator assembly as shown in FIG. 9B, but which employs multiple deforming rings comprising an RFID tag; and, FIG. 9E shows a pre-failure indicator assembly as shown in FIG. 9A for a two-path sling.

A two-path roundsling 10a may comprise two pre-failure indicator assemblies 20a and 20b, as shown in FIG. 9E, with one assembly 20 for each sling path. The components of each pre-failure indicator assembly 20a and 20b are the same, as described above. The operation of the warning signal is the same as described above for the one path roundsling 10.

The RFID pre-failure warning systems 40 described above are preferably used as a monitoring system during operation of a single-path roundsling 10 or two-path roundsling 10a. The RFID pre-failure warning systems 40 may be used, for example, in accordance with a method for detecting a pre-failure condition in a roundsling 10 or 10a. In general, the methods comprise detecting a signal transmitted from the RFID sensor 44, for example, using the RFID signal receiver 46. The methods may further comprise taking corrective action to avoid, prevent, or mitigate against failure of the roundsling 10 or 10a. The corrective action may include, for example, cessation of lifting and returning the material(s) being lifted to a base. The corrective action may also include replacing the roundsling 10 or 10a.

The disclosure is not limited to the embodiments described and exemplified above, but is capable of variation and modification within the scope of the appended claims.

I claim:

1. A roundsling pre-failure warning system, comprising:
a roundsling comprising a loadbearing core, characterized by:
an indicator yarn having at least one radio frequency identification (RFID) tag affixed to the indicator yarn,
at least one RFID sensor including a transmitter, and
a RFID signal receiver, the transmitter for sending a wireless signal to the RFID receiver, the system configured such that the RFID sensor transmits a signal to the RFID signal receiver when the RFID tag passes by the RFID sensor.

2. The roundsling pre-failure warning system of claim 1, further comprising a pre-failure indicator assembly comprising a dedicated strand having an eye-loop on each end joined together via at least one ring that fails at a load capacity that is less than the maximum load capacity of the load-bearing core, wherein the dedicated strand is positioned proximate to the core, and wherein the indicator yarn is connected to the dedicated strand.

3. The roundsling pre-failure warning system of claim 1, wherein the core is housed within a cover having an opening through which an end portion of the indicator yarn passes, thereby exposing the end portion of the indicator yarn to the exterior of the cover.

4. The roundsling pre-failure warning system of claim 3, wherein the RFID tag is affixed to the end portion of the indicator yarn and the RFID sensor is proximate to the opening.

5. The roundsling pre-failure warning system of claim 4, wherein the cover comprises a label attached to the exterior of the cover, and the RFID sensor is positioned underneath the label.

6. The roundsling pre-failure warning system of claim 1, wherein the RFID signal receiver is positioned within a handheld wireless device, and informs a user of a pre-failure condition with the roundsling by one or more of emitting an audible alarm, displaying a warning, or producing a tactile alarm.

7. The roundsling pre-failure warning system of claim 1, wherein the roundsling is a two-path roundsling, the loadbearing core comprising a first loadbearing core and a second loadbearing core, the indicator yarn comprising a first indicator yarn and a second indicator yarn, the RFID tag comprising a first RFID tag and a second RFID tag, the at least one RFID sensor comprising a first RFID sensor and a second RFID sensor and the transmitter comprising a first transmitter and a second transmitter, the two-path roundsling including a first path associated with the first loadbearing core, the first indicator yarn, the first RFID tag, the first RFID sensor and the first transmitter and a second path associated with the second loadbearing core, the second indicator yarn, the second RFID tag, the second RFID sensor and the second transmitter.

8. The roundsling pre-failure warning system of claim 7, wherein the first path further comprises a first pre-failure indicator assembly comprising a first dedicated strand having a first eye-loop on each end joined together via a first ring that fails at a load capacity that is less than the maximum load capacity of the first load-bearing core, wherein the first dedicated strand is positioned proximate to the first loadbearing core, and wherein the first indicator yarn is connected to the first dedicated strand.

9. A roundsling pre-failure warning system, comprising:
a roundsling having a loadbearing core,
a pre-failure indicator assembly including a dedicated strand positioned proximate to the core and having an eye-loop on each end joined together via a ring that fails at a load capacity that is less than the maximum load capacity of the loadbearing core,
characterized by the pre-failure indicator having at least one radio frequency identification (RFID) tag affixed to the dedicated strand,
at least one RFID sensor including a transmitter for sending a wireless signal, and
a RFID signal receiver configured to receive the wireless signal from the transmitter, the system configured such that when the roundsling is overloaded, the ring becomes compromised, thereby allowing the dedicated strand to move upstream and, if the dedicated strand moves far enough, the RFID tag passes by the RFID sensor which sends a warning signal to RFID signal receiver.

10. The roundsling pre-failure warning system of claim 9, wherein the at least one RFID tag comprises a plurality of RFID tags the plurality of RFID tags, affixed to the dedicated strand.

11. The roundsling pre-failure warning system of claim 9, wherein the at least one RFID sensor comprises at least two RFID sensors.

12. The roundsling pre-failure warning system of claim 9, further comprising an indicator yarn attached to the dedicated strand, wherein the core is housed within a cover having an opening through which an end portion of the indicator yarn passes, thereby exposing the end portion of the indicator yarn to the exterior of the cover.

13. The roundsling pre-failure warning system of claim 9, wherein the RFID signal receiver is positioned within a handheld wireless device, and informs a user of a pre-failure condition with the roundsling by one or more of emitting an audible alarm, displaying a warning, or producing a tactile alarm.

14. The roundsling pre-failure warning system of claim 9, wherein the roundsling is a two-path roundsling including a first path and a second path, the loadbearing core including a first core and a second core, the dedicated strand including a first dedicated strand positioned proximate to the first core and a second dedicated strand positioned proximate to the second core, the first and second dedicated strands including eye-loops on their ends, respectively, the eye-loops of the first dedicated strand joined together via a first ring and the eye-loops of the second dedicated strand joined together via a second ring, the first and second rings failing at a load capacity that is less than a maximum load capacity of the first load bearing core and the second load bearing core, respectively, the at least one RFID tag including a first RFID tag affixed to the first dedicated strand and a second RFID tag affixed to the second dedicated strand, the at least one RFID sensor including a first RFID sensor and a second RFID sensor, the transmitter including a first transmitter associated with the first RFID sensor and a second transmitter associated with the second RFID sensor.

15. A roundsling pre-failure warning system, comprising:
a roundsling having a loadbearing core,
a pre-failure indicator assembly including a dedicated strand having an eye-loop on each end, the eye-loops on each end of the dedicated strand joined together via at least one ring that fails at a load capacity that is less than the maximum load capacity of the load-bearing core, characterized by said at least one ring comprising at least one active radio frequency identification (RFID) tag, the at least one active RFID tag including a shield that blocks a signal from the at least one RFID tag until the shield is compromised,
an indicator yarn connected to the dedicated strand, and
a RFID signal receiver.

16. The roundsling pre-failure warning system of claim 15, wherein the at least one ring comprises a plurality of rings, each of the plurality of rings fails at a load capacity that is less than the maximum load capacity of the load-bearing core, each of the plurality of rings associated with one of the at least one active RFID tag.

17. A method for detecting a pre-failure condition in the roundsling, comprising detecting the wireless signal from the roundsling pre-failure warning system of claim 1 with the RFID signal receiver, and taking remedial action to avoid failure of the roundsling.

18. A method for detecting a pre-failure condition in the roundsling, comprising detecting the wireless signal from the roundsling pre-failure warning system of claim 9 with the RFID signal receiver, and taking remedial action to avoid failure of the roundsling.

19. A method for detecting a pre-failure condition in the roundsling comprising detecting the wireless signal from the roundsling pre-failure warning system of claim 15 with the RFID signal receiver, and taking remedial action to avoid failure of the roundsling.

* * * * *